United States Patent
Moore

(10) Patent No.: US 11,967,786 B1
(45) Date of Patent: Apr. 23, 2024

(54) TRACER WIRE GROUNDING ROD

(71) Applicant: NWCAT LLC, Grand Junction, CO (US)

(72) Inventor: Christopher L. Moore, Grand Junction, CO (US)

(73) Assignee: Stuart Steel Protection, LLC, Houston, TX (US)

( * ) Notice: Subject to any disclaimer, the term of this patent is extended or adjusted under 35 U.S.C. 154(b) by 7 days.

(21) Appl. No.: 17/662,679

(22) Filed: May 10, 2022

Related U.S. Application Data

(60) Provisional application No. 63/201,746, filed on May 11, 2021.

(51) Int. Cl.
*H01R 13/00* (2006.01)
*H01R 13/652* (2006.01)
*H01R 4/66* (2006.01)

(52) U.S. Cl.
CPC ............ *H01R 13/652* (2013.01); *H01R 4/66* (2013.01)

(58) Field of Classification Search
CPC ................................. H01R 13/652; H01R 4/66
See application file for complete search history.

(56) References Cited

U.S. PATENT DOCUMENTS

| | | | |
|---|---|---|---|
| 2011/0143568 A1* | 6/2011 | King, Jr. ............... | H01R 4/70 29/874 |
| 2014/0191759 A1* | 7/2014 | Olsson ................. | G01V 3/08 324/329 |
| 2015/0369953 A1* | 12/2015 | Bailey .................. | G01V 3/38 324/326 |
| 2021/0087775 A1* | 3/2021 | Thompson ............ | E03B 9/10 |

OTHER PUBLICATIONS

KR 101568782 B1 English Translation (Year: 2015).*
Rubbleke, "Do I Need to Ground My Tracer Wire?", May 8, 2019, 2 pages.
Dester, "Best Practices for Installing Tracer Wire Systems," 29 pages.
"Best Practices for Tracer Wire System Installation," 2017, 50 pages.

* cited by examiner

*Primary Examiner* — Pete T Lee
(74) *Attorney, Agent, or Firm* — FisherBroyles, LLP; Craig W. Mueller

(57) ABSTRACT

A tracer wire configured to be situated on, or adjacent to a buried utility line is provided. The tracer wire allows the hidden utility line to be quickly and accurately identified. A tracer wire grounding rod is interconnected to the tracer wire and provides a means by which electrical current used to identify utility line can travel through the earth to a ground point. The tracer wire grounding rod has a prong residing in a cavity that receives one end of the tracer wire.

20 Claims, 2 Drawing Sheets

TRACER WIRE GROUNDING ROD

This application claims the benefit of U.S. Provisional Patent Application Ser. No. 63/201,746, filed May 11, 2021, the entirety of which is incorporated by reference herein.

FIELD OF THE INVENTION

Embodiments of the present invention are generally related to devices and methods that facilitate grounding a tracer wire associated with a utility line.

BACKGROUND OF THE INVENTION

Those of ordinary skill in the art will appreciate that it is very important to locate buried utility lines or pipes. In the past, the use of buried metallic pipelines made location relatively easy using magnetic detection devices. Indeed, even if a metallic pipeline was buried to a depth that made magnetic detection difficult, the pipeline could be energized and the frequency of the current flowing through the pipeline could be detected by surface equipment. The increasing use of nonmetallic lines and conduits has made detection by traditional methods difficult or impossible.

Accordingly, nonmetallic pipelines, such as gas service lines, are often buried with locating wire, known to those of skill in the art as "tracer wire," which helps technicians find buried nonmetallic pipelines. Tracer wire is buried next to and along a pipeline and is most commonly used in the water-gas, sewer, fiber-optic, etc., fields. Tracer wires are also used in directional drilling applications. Further, tracer wires are especially desirable in pipeline installations that follow a random and unpredictable path. The beginning and end points of a tracer line run are associated with above-ground or near-surface access points that may incorporate selective grounding means.

In some applications, the tracer wire is found with a device with the ability to locate non-energized wire. In other applications, tracer wires are energized by applying a low-voltage charge to the tracer wire. Ideally, the low-voltage charge is of a low frequency, allowing very accurate identification of longer utility line spans. Low frequency is preferred as it maximizes electrical energy within the tracer wire. High-frequency voltage can be used, but it is not ideal as such energy will "jump" to unintended targets, increasing the probability of line strikes in areas containing a cluster of utility lines.

Those of ordinary skill in the art will appreciate that buried line identification requires both ends of the tracer wire to be properly grounded. FIG. 1 illustrates this notion, wherein a grounded transmitter 2 is used to energize a first end 6 of the tracer wire 10. The second end 14 of the tracer wire, which is shown interconnected to an access point 18, must be grounded so current 22 traveling through the tracer wire 10 can move to ground 24 and return to the transmitter 2 to complete a circuit for accurate utility line detection. Normally, the tracer wire 10 at one or both ends is associated with a tracer wire ground rod 28, which will be described below. The access point 18 may have the ability to selectively create a ground point so specific sections of the utility line 32 can be accurately identified. Although FIG. 1 implies that the grounding rod 28 is placed deep within the earth, one of ordinary skill in the art will appreciate it can be located closer to ground level to facilitate replacement.

SUMMARY OF THE INVENTION

It is one aspect of some embodiments of the present invention to provide a tracer wire grounding rod that helps protect the tracer wire. More specifically, one embodiment of the present invention is a tracer wire grounding rod having a substantially cylinder outer surface terminating in a point that facilitates rod insertion into the ground. The opposite end of the grounding rod is a cavity that accommodates a conductive prong. The walls of the cavity, thus, protect the prong from damage. An aperture that receives the end of the tracer wire extends through the outer surface and into the cavity. In some embodiments, a channel is also provided in the outer surface of the grounding rod configured to accept at least a portion of the tracer wire wound about the grounding rod. The channel, which may be of a helical configuration, is designed to stabilize at least a portion of the tracer wire to help maintain the fidelity of the connection between the tracer wire and the prong.

In some embodiments, a cap is provided that fits over the opening in the grounding rod, selectively engages the outer surface of the rod, and captures a portion of the tracer wire. The cap is made of a durable or rigid material that protects the grounding rod and tracer wire from damage as the grounding rod is beaten into the ground. In some embodiments of the present invention, the cap provides a tight seal between the grounding rod's outer surface and an insulated portion of the tracer wire to reduce the chances of moisture ingress into the opening, thereby reducing prong corrosion.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

BRIEF DESCRIPTION OF THE DRAWINGS

The accompanying drawings, which are incorporated in and constitute a part of the specification, illustrate embodiments of the invention and, together with the general description of the invention given above and the detailed description of the drawings given below, serve to explain the principles of these inventions.

Figure 1:
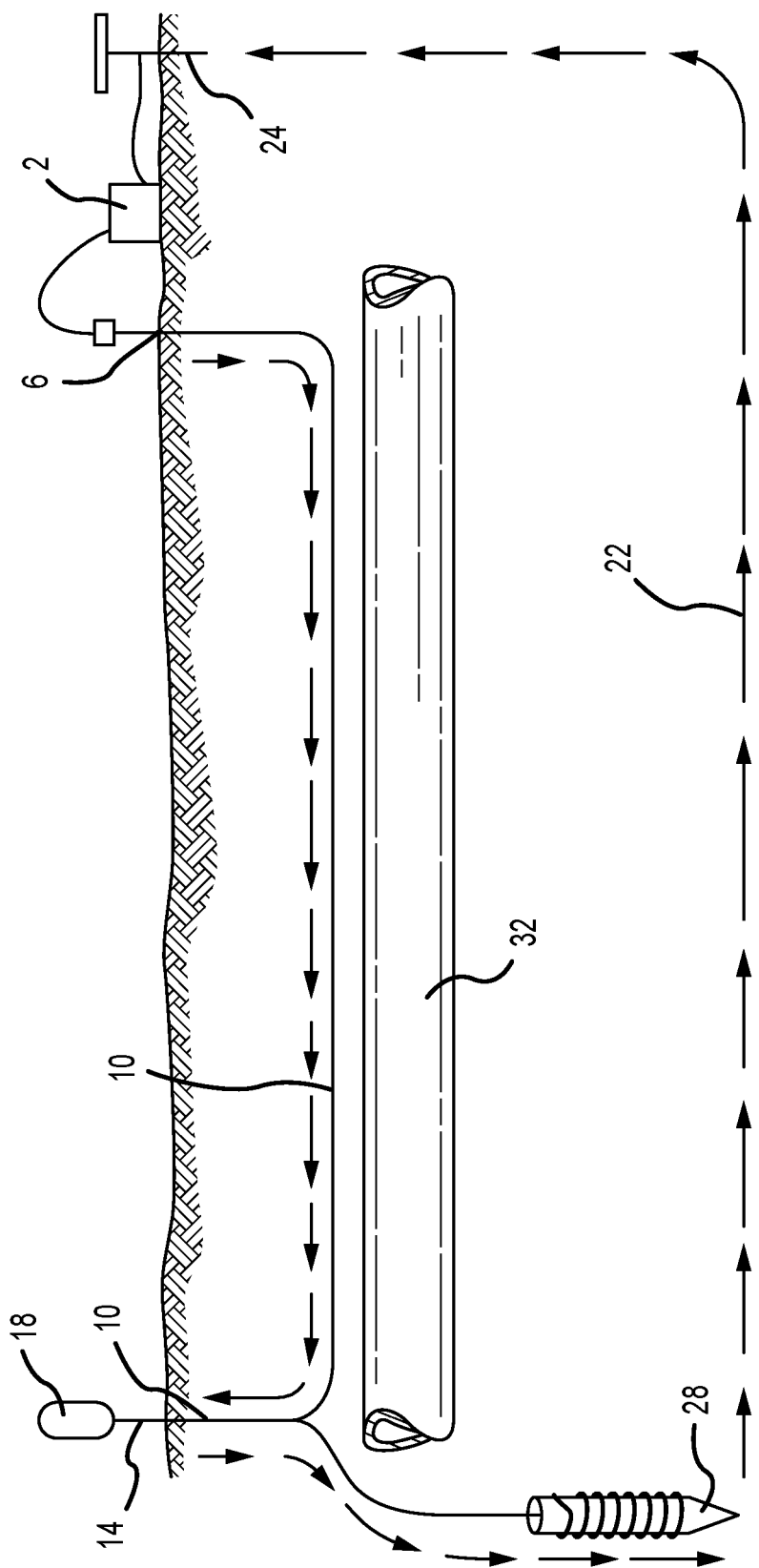
FIG. 1 is a schematic showing common tracer wire placement relative to a utility line.

The following component list and associated numbering found in the drawings is provided to assist in the understanding of one embodiment of the present invention:

| # | Component |
|---|---|
| 2 | Transmitter |
| 6 | First end |
| 10 | Tracer wire |
| 18 | Access point |
| 22 | Current |
| 24 | Ground |
| 28 | Grounding rod |
| 32 | Utility line |
| 36 | Spike |
| 40 | Cavity |
| 44 | Prong |
| 48 | Orifice |
| 54 | Channel |
| 58 | Cap with |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 2:
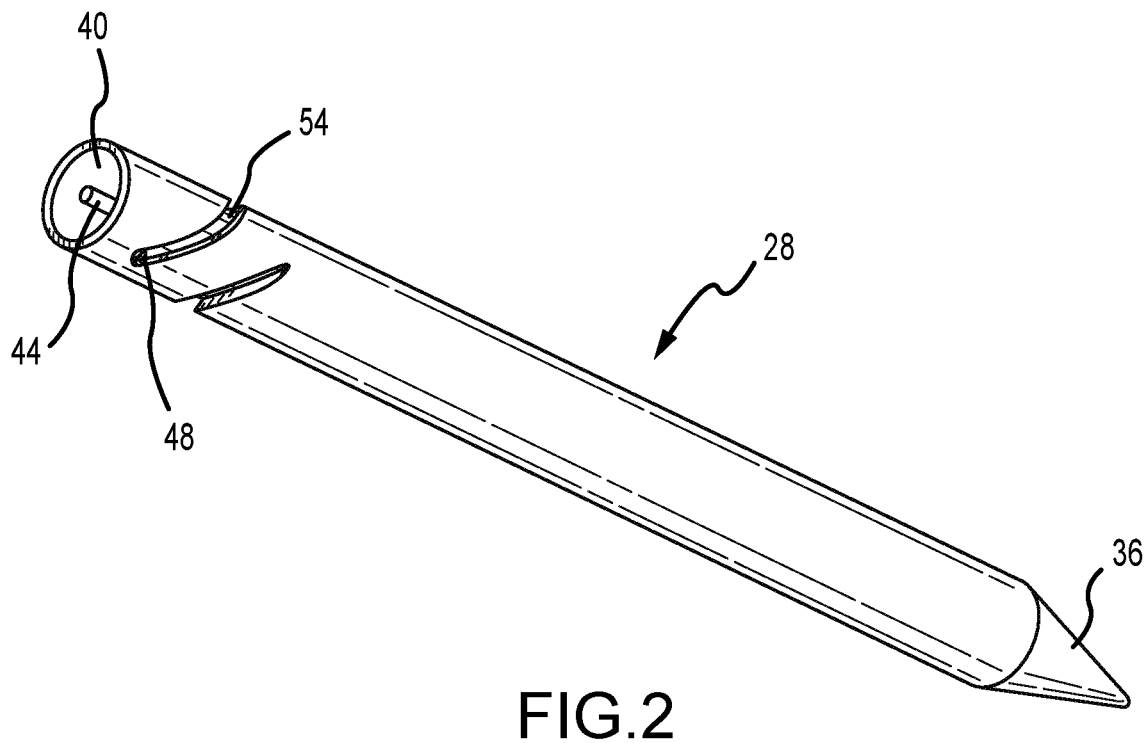
FIG. 2 is a tracer wire grounding rod of one embodiment of the present invention.
Figure 3:
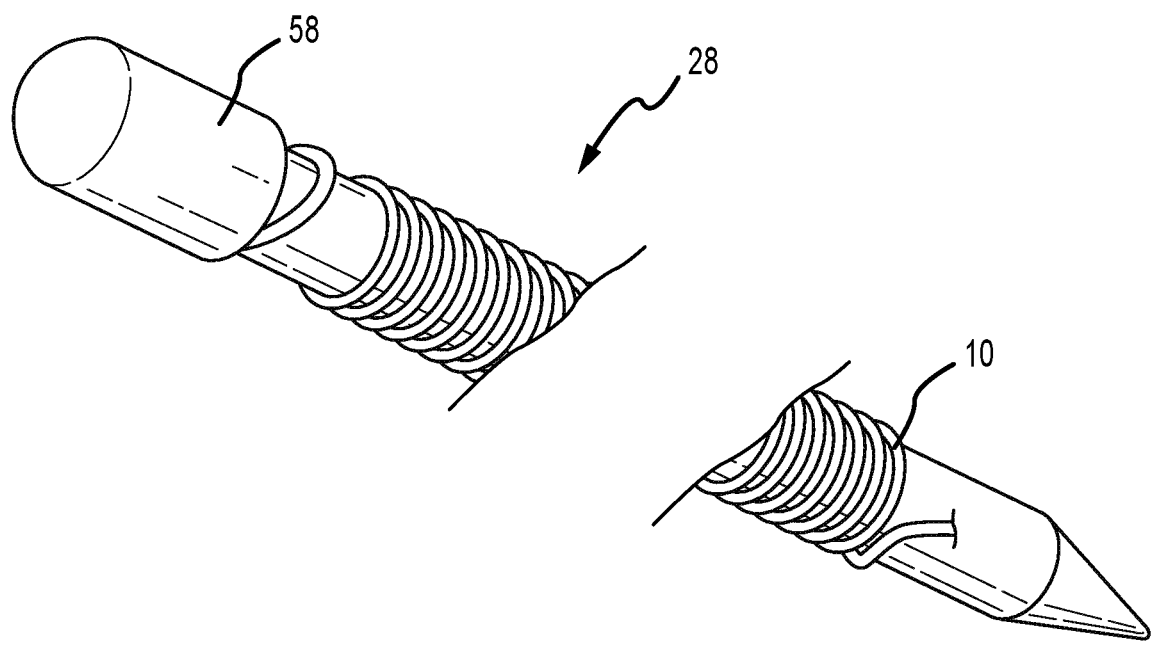
FIG. 3 is a tracer wire grounding rod shown in FIG. 2 wrapped with tracer wire.

FIGS. 2 and 3 show a tracer wire grounding rod 28 of one embodiment of the present invention comprising a first end with a spike 36 spaced from the second end having a cavity 40. The cavity 40 includes a prong 44 that accepts one end of the tracer wire 10. In operation, insulation is removed from an end of the tracer wire that will be attached to the grounding rod 28. The bare end is threaded through an orifice 48 that extends from an outer surface of the grounding rod 28 into the cavity 40. The bare end is interconnected to the prong 44, which creates an electric connection between the tracer wire 10 and the grounding rod 28. The tracer wire 10 is then wrapped about the grounding rod 28, wherein the initial wire wrapping is optionally seated in a channel 54 provided in the grounding rod's outer surface. The tracer wire 10 extending from the grounding rod 28 is placed adjacent to the utility line, which should be familiar to those of ordinary skill in the art.

FIG. 3 shows a cap 58 that helps ensure the connection between the tracer wire 10 and prong 44 maintains fidelity. The cap 58 blocks water ingress into the cavity 40 and helps prevent corrosion of the bare tracer wire 10. In some embodiments, the grounding rod 28 is magnesium, which provides cathodic protection against tracer wire corrosion. The cap 58 of one embodiment is very durable, thereby protecting the grounding rod 28 and interconnected tracer wire 10 as it is hammered into the ground.

Exemplary characteristics of embodiments of the present invention have been described. However, to avoid unnecessarily obscuring embodiments of the present invention, the preceding description may omit several known apparatus, methods, systems, structures, and/or devices one of ordinary skill in the art would understand are commonly included with the embodiments of the present invention. Such omissions are not to be construed as a limitation of the scope of the claimed invention. Specific details are set forth to provide an understanding of some embodiments of the present invention. It should, however, be appreciated that embodiments of the present invention may be practiced in a variety of ways beyond the specific detail set forth herein.

Modifications and alterations of the various embodiments of the present invention described herein will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. That is, the embodiments of the invention described herein are capable of being practiced or of being carried out in various ways. The scope of the various embodiments described herein is indicated by the following claims rather than by the foregoing description. And all changes which come within the meaning and range of equivalency of the claims are to be embraced within their scope. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The foregoing disclosure is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed inventions require more features than expressly recited. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Further, the embodiments of the present invention described herein include components, methods, processes, systems, and/or apparatus substantially as depicted and described herein, including various sub-combinations and subsets thereof. Accordingly, one of skill in the art will appreciate that would be possible to provide for some features of the embodiments of the present invention without providing others. Stated differently, any one or more of the aspects, features, elements, means, or embodiments as disclosed herein may be combined with any one or more other aspects, features, elements, means, or embodiments as disclosed herein.

What is claimed is:

1. A tracer wire grounding rod, comprising:
   a first end;
   a second end having a cavity that accommodates a prong adapted to selectively interconnect to a tracer wire; and
   an orifice that extends from an outer surface of the grounding rod into the cavity.

2. The grounding rod of claim 1, wherein the first end comprises a sharpened point.

3. The grounding rod of claim 1, wherein an outer surface of the grounding rod includes a channel configured to receive a portion of a tracer wire.

4. The grounding rod of claim 3, wherein the channel is positioned adjacent to the cavity.

5. The grounding rod of claim 1, further comprising a cap selectively interconnected to the second end.

6. A tracer wire grounding rod, comprising:
   a first end;
   a second end having a cavity that accommodates a prong adapted to selectively interconnect to a tracer wire;
   an orifice that extends from an outer surface of the grounding rod into the cavity; and
   a cap selectively interconnected to the second end.

7. The grounding rod of claim 6, wherein the first end comprises a sharpened point.

8. The grounding rod of claim 6, wherein an outer surface of the grounding rod includes a channel configured to receive a portion of a tracer wire.

9. The grounding rod of claim 8, wherein the channel is positioned adjacent to the cavity.

10. A system for identifying an underground utility line, comprising:
    a tracer wire positioned adjacent to at least a portion of a utility line, the tracer wire having a first end associated with an access point and a second end associated with a transmitter;
    a tracer wire grounding rod comprising a first end and a second end having a cavity that accommodates a prong adapted to selectively interconnect to a tracer wire; and
    an orifice that extends from an outer surface of the grounding rod into the cavity.

11. The grounding rod of claim 10, wherein an outer surface of the grounding rod includes a channel configured to receive a portion of a tracer wire.

12. The grounding rod of claim 11, wherein the channel is positioned adjacent to the cavity.

13. The grounding rod of claim 10, further comprising a cap selectively interconnected to the second end.

14. The grounding rod of claim 10, wherein the first end comprises a sharpened point.

15. A tracer wire grounding rod, comprising:
    a first end;
    a second end having a cavity that accommodates a prong adapted to selectively interconnect to a tracer wire; and
    wherein an outer surface of the grounding rod includes a channel configured to receive a portion of the tracer wire.

16. The grounding rod of claim 15, wherein the channel is positioned adjacent to the cavity.

17. The grounding rod of claim 15, further comprising a cap selectively interconnected to the second end.

18. A system for identifying an underground utility line, comprising:
    a tracer wire positioned adjacent to at least a portion of a utility line, the tracer wire having a first end associated with an access point and a second end associated with a transmitter;
    a tracer wire grounding rod comprising a first end and a second end having a cavity that accommodates a prong adapted to selectively interconnect to a tracer wire; and
    wherein an outer surface of the grounding rod includes a channel configured to receive a portion of the tracer wire.

19. The grounding rod of claim 18, wherein the channel is positioned adjacent to the cavity.

20. The grounding rod of claim 18, further comprising a cap selectively interconnected to the second end.

\* \* \* \* \*